United States Patent
Mohaupt et al.

(10) Patent No.: US 10,455,578 B2
(45) Date of Patent: Oct. 22, 2019

(54) APPARATUS, METHOD, AND COMPUTER PROGRAM FOR FREQUENCY BAND SELECTION

(71) Applicant: VOLKSWAGEN AG, Wolfsburg (DE)

(72) Inventors: Matthias Mohaupt, Bochum (DE); Sascha Jurthe, Hattingen (DE)

(73) Assignee: VOLKSWAGEN AG (DE)

( * ) Notice: Subject to any disclaimer, the term of this patent is extended or adjusted under 35 U.S.C. 154(b) by 85 days.

(21) Appl. No.: 15/349,458

(22) Filed: Nov. 11, 2016

(65) Prior Publication Data
US 2017/0142725 A1    May 18, 2017

(30) Foreign Application Priority Data

Nov. 12, 2015   (DE) .......................... 10 2015 222 309

(51) Int. Cl.
| | |
|---|---|
| H04W 72/04 | (2009.01) |
| H04W 4/40 | (2018.01) |
| H04W 16/14 | (2009.01) |
| H04W 4/04 | (2009.01) |
| H04W 84/12 | (2009.01) |
| H04W 36/06 | (2009.01) |
| H04W 36/14 | (2009.01) |
| H04W 36/30 | (2009.01) |
| H04W 88/06 | (2009.01) |
| H04W 88/10 | (2009.01) |

(52) U.S. Cl.
CPC ......... *H04W 72/0453* (2013.01); *H04W 4/40* (2018.02); *H04W 16/14* (2013.01); *H04W 4/046* (2013.01); *H04W 36/06* (2013.01); *H04W 36/14* (2013.01); *H04W 36/30* (2013.01); *H04W 72/042* (2013.01); *H04W 84/12* (2013.01); *H04W 88/06* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 2010/0332822 A1* | 12/2010 | Liu .................. | H04W 12/04 713/151 |
| 2011/0255455 A1* | 10/2011 | Seok ................ | H04W 36/06 370/311 |
| 2014/0010186 A1 | 1/2014 | Cordeiro | |

(Continued)

OTHER PUBLICATIONS

Search Report from German Patent Application No. 10 2015 222 309.4; dated Jun. 24, 2016.

*Primary Examiner* — Anh Vu H Ly
(74) *Attorney, Agent, or Firm* — Barnes & Thornburg LLP (57) ABSTRACT

Apparatuses, a method, and a computer program for influencing the selection of a frequency band for wireless communication with a mobile station. Disclosed is an apparatus, method, and computer program for controlling a frequency band selection for wireless communication with a mobile station in a wireless local area network—WLAN—, wherein at least a first and a second frequency band are selectable, the first and second frequency bands each having multiple transmission channels; and having a transmission circuit for transmitting at least one command to the mobile station that asks the mobile station to change from the first to the second frequency band, or vice versa.

24 Claims, 3 Drawing Sheets

(56) References Cited

U.S. PATENT DOCUMENTS

| | | | |
|---|---|---|---|
| 2014/0029520 A1 | 1/2014 | Farricker | |
| 2015/0139032 A1 | 5/2015 | Ko et al. | |
| 2015/0139204 A1* | 5/2015 | Emmanuel | H04B 1/005 370/338 |
| 2015/0230093 A1* | 8/2015 | Park | H04W 12/08 726/4 |
| 2015/0282032 A1* | 10/2015 | Gupta | H04W 36/22 370/237 |
| 2016/0050614 A1* | 2/2016 | Son | H04W 48/12 455/434 |
| 2017/0135104 A1* | 5/2017 | Emmanuel | H04L 12/44 370/338 |
| 2017/0142724 A1* | 5/2017 | Mohaupt | H04B 1/3822 370/338 |
| 2017/0264475 A1* | 9/2017 | Son | H04L 27/2613 370/338 |

* cited by examiner

APPARATUS, METHOD, AND COMPUTER PROGRAM FOR FREQUENCY BAND SELECTION

PRIORITY CLAIM

This patent application claims priority to German Patent Application No. 10 2015 222 309.4, filed 12 Nov. 2015, the disclosure of which is incorporated herein by reference in its entirety.

SUMMARY

Exemplary embodiments relate to the control of a frequency band selection and the control of the frequency band selection for devices that govern at least two frequency bands. This control may also be fitted in motor vehicles.

BRIEF DESCRIPTION OF THE DRAWINGS

Some exemplary embodiments are explained in more detail below with reference to the accompanying figures, in which.

DETAILED DESCRIPTION

Wireless networks—called wireless local area networks, WLAN—can also be provided inside vehicles. Such networks can be set up between mobile stations and base stations as subscribing stations, base stations being able to be permanently installed in vehicles. In the present case, base stations are also referred to as apparatuses. Customary frequency bands for such WLAN networks are 2.4 GHz and 5 GHz. For efficient operation of the WLAN networks, it appears beneficial to allocate frequency bands to subscribing stations. This allows efficient use of the existent radio spectrum and of the available bandwidth to be achieved. For the purpose of simple usability, it appears beneficial to use the same service group identification number—service set identification (SSID)—in both cited frequency bands, so that they appear as a single network to the user. The choice of frequency band is allocated to the mobile station in the WLAN standard. For this reason, the base station has only limited influence on this selection.

Known base station control methods for giving preference to one frequency band alter the response of the base station in relation to the mobile stations. As such, messages for confirming association for the mobile station can be slowed down by the base station, or not sent in the first place, for example, if the mobile station desires association on the unpreferred frequency band. On the preferred frequency band, on the other hand, the relevant confirmation can be sent immediately by the base station. However, such methods are unreliable and dependent on the respective circumstances of the environment and of the implementations and manufacturing tolerance of the devices. Further, the performance of the respective band is at least temporarily reduced.

The document US 2014/0010186 A1 describes a wireless network having a central controller and a plurality of stations. The central controller is designed to transmit to one of the stations a frame that indicates an available channel and a frequency band associated with the available channel.

The document US 2014/0029520 A1 describes a WLAN channel allocation in a communication network. In this case, a controller can allocate a plurality of communication channels to a device.

The document US 2015/0139032 A1 relates to an apparatus for accessing a wireless network. In this case, the apparatus can use a frequency band selected from a plurality of frequency bands to access the wireless network.

It would be desirable to offer alternative selection options to prompt the mobile station to reliably change the frequency band without reducing the performance of frequency bands.

A core concept of the disclosed embodiments is expansion of the WLAN standard. Additional commands can be used to prompt the mobile station to change frequency band in a reliable manner. Workarounds for the protocol are avoided.

A first exemplary embodiment provides an apparatus that controls a frequency band selection for wireless communication with a mobile station in a wireless local area network—WLAN. The apparatus allows at least a first and a second frequency band to be selected. The first and second frequency bands each comprise a multiplicity of transmission channels. The apparatus comprises a transmission circuit for transmitting at least one command to the mobile station that asks the mobile station to change from the first to the second frequency band, or vice versa. It is possible to bring about reliable changeover of the frequency bands with compatible devices.

Optionally, the apparatus may comprise a provision circuit for providing results, ascertained before the change from the first to the second frequency band, or vice versa, of an authentication and/or an association between the mobile station and the apparatus and/or a Dynamic Host Configuration Protocol—DHCP—procedure between the mobile station and the apparatus that continue to be used after the change from the first to the second frequency band, or vice versa. This allows the effect of saving radio resources to be achieved.

In some exemplary embodiments, the apparatus may comprise a control circuit for arranging a media access control—MAC—between the mobile station and the apparatus after the change from the first to the second frequency band, or vice versa. This allows reference to be made to the existing IEEE 802.11 standard.

In some disclosed embodiments, the apparatus may comprise a two-way circuit for maintaining the arranged association between the apparatus and the mobile station if it is not possible to implement the change from the first to the second frequency band, or vice versa. This allows disassociation of the connection between apparatus and mobile station to be avoided.

Optionally, an apparatus according to one of the exemplary embodiments may be arranged in a motor vehicle, the apparatus being arranged such that the whole interior of the motor vehicle is available for spatial positioning of the mobile station for a communication with the apparatus.

In some exemplary embodiments, a mobile station for a frequency band selection for wireless communication with an apparatus in a wireless local area network—WLAN— may be connected in which at least a first and a second frequency band are selectable, the first and second frequency bands each comprising a multiplicity of transmission channels. In this case, the mobile station comprises a reception circuit for receiving at least one command from the apparatus that asks the mobile station to change from the first to the second frequency band, or vice versa. Such a reliable frequency change can be achieved without reducing the power of the previous frequency band.

In some disclosed embodiments, the mobile station may further comprise a provision circuit for providing results, ascertained before the change from the first to the second frequency band, or vice versa, of an authentication and/or an association between the mobile station and the apparatus and/or of a Dynamic Host Configuration Protocol—DHCP—procedure between the mobile station and the apparatus that continue to be used after the change from the first to the second frequency band, or vice versa. This increases the efficiency of the system, since various method operations from the previous frequency band do not have to be repeated.

Optionally, the mobile station may further comprise a control circuit for arranging a media access control—MAC—between the mobile station and the apparatus after the change from the first to the second frequency band, or vice versa. This allows the media access control corresponding to the new frequency band to be activated.

In some exemplary embodiments, the mobile station may further comprise a two-way circuit for maintaining the arranged association between apparatus and mobile station if it is not possible to implement the change from the first to the second frequency band, or vice versa. This allows termination of the connection to be avoided if it is not possible to implement the change.

In some disclosed embodiments, a system for controlling a frequency band selection for wireless communication in a wireless local area network—WLAN—with an apparatus according to the cited apparatus exemplary embodiments and a mobile station according to the cited mobile station exemplary embodiments can be used.

Optionally, a method for controlling a frequency band selection for wireless communication by an apparatus with a mobile station in a wireless local area network—WLAN—can be used. In this case, at least a first and a second frequency band are selectable, the first and second frequency bands each comprising a multiplicity of transmission channels. The method comprises a transmission of at least one command to the mobile station that asks the mobile station to change from the first to the second frequency band, or vice versa. Such a reliable frequency change can be achieved without reducing the power of the previous frequency band.

In some exemplary embodiments, results, ascertained in methods before the change from the first to the second frequency band, or vice versa, of an authentication and/or an association between the mobile station and the apparatus and/or of a Dynamic Host Configuration Protocol—DHCP—procedure between the mobile station and the apparatus can be provided for use after the change from the first to the second frequency band, or vice versa. This increases the efficiency of the system, since various method operations for using the previous frequency band do not have to be repeated.

In some disclosed embodiments, a method may be characterized in that an arrangement of a media access control—MAC—between the mobile station and the apparatus is made again after the change from the first to the second frequency band, or vice versa. This allows the media access control corresponding to the new frequency band to be activated.

Optionally, a method may be characterized in that if it is not possible to implement the change from the first to the second frequency band, or vice versa, then the association between apparatus and mobile station that was arranged before the command to change from the first to the second frequency band, or vice versa, is maintained. This allows connection termination to be avoided if it is not possible to implement the change.

In some exemplary embodiments, a computer program may be designed to perform at least one operation of the method exemplary embodiments cited above, the computer program running on a programmable hardware component.

Optionally, according to a further disclosed embodiment, an apparatus for influencing the selection of a frequency band for wireless communication with a mobile station may comprise a transmission circuit that is designed to send a beacon signal at a first transmission power in the frequency band. Further, the apparatus comprises a recognition circuit that is designed to recognize a connection request from a mobile station in the frequency band. Furthermore, the apparatus comprises a control circuit that is designed to respond to the connection request by prompting a transmission of the beacon signal at a second transmission power, which is different than the first transmission power, if the mobile station is unknown to the apparatus. This allows the effect of influencing the frequency band selection for all mobile stations that support at least two frequency bands to be achieved.

Optionally, the control circuit may further be designed to set the second transmission power lower than the first transmission power. This supports the selection effect while at the same time saving the radio resources of the unpreferred frequency band.

In some exemplary embodiments, the control circuit may further be designed to maintain the second transmission power for a prescribed time and subsequently to prompt the first transmission power again. This reduces the association capability of the unpreferred frequency band only temporarily.

In some disclosed embodiments, the control circuit may further be designed to respond to the connection request by a mobile station that is known to the apparatus in the frequency band by maintaining the first transmission power. This supports association with the un preferred frequency band when an association attempt by the mobile station using the preferred frequency band has failed.

Optionally, the control circuit may further be designed to respond to the connection request from an unknown mobile station in the frequency band by storing an individual terminal identifier in the apparatus. This allows a repeated association attempt by the mobile station in the frequency band to be recognized.

In some exemplary embodiments, the control circuit may further be designed to respond to each connection request in the frequency band by checking whether the individual terminal identifier is stored. This allows a further association attempt by the mobile station in this frequency band to be facilitated.

In some disclosed embodiments, the control circuit may further be designed to follow termination of a connection or to follow expiry of a further prescribed time by erasing the individual terminal identifier. This allows a later association attempt to prompt fresh influencing of the choice of frequency band by the mobile station to be achieved.

Optionally, the transmission circuit may further be designed to arrange the frequency band at 2.4 GHz and a further frequency band at 5 GHz and/or to form it as a wireless local area network—WLAN—frequency band. This allows an association with the base station to be made possible for a large number of standardized mobile stations.

In some exemplary embodiments, the apparatus may furthermore comprise a transmission circuit that is designed to send a beacon signal in a further frequency band at a transmission power specific to the further frequency band and also a recognition circuit that is designed to recognize the connection request from a mobile station in the further frequency band and furthermore a control circuit that is designed to confirm the connection request from the mobile station. This can allow the association of the mobile station on the preferred frequency band.

In some exemplary embodiments, a method for influencing the selection of a frequency band for wireless communication by an apparatus with a mobile station is used. The method comprises the sending of a beacon signal at a first transmission power in the frequency band, the recognition of a connection request from a mobile station in the frequency band and the transmission of the beacon signal at a second transmission power, which is different than the first transmission power, if the mobile station is unknown to the apparatus. This allows the effect of influencing the frequency band selection for all mobile stations that support at least two frequency bands to be achieved.

In some disclosed embodiments, a method can be used in which a connection request from an unknown mobile station in the frequency band is rejected. This allows a first connection request in the unpreferred frequency band to be rejected.

Optionally, a method can be used in which a beacon signal is sent in a further frequency band and the connection request from the mobile station in the further frequency band is confirmed. This allows the preferred frequency band to be used.

In some exemplary embodiments, a method can be used in which the second transmission power in the frequency band is maintained for a prescribed time and subsequently the first transmission power is again used for sending. This allows the reduced availability for connection setup in the frequency band to be limited in terms of time.

In some disclosed embodiments, a method can be used in which a connection request from an unknown mobile station in the frequency band prompts an individual terminal identifier to be stored to announce the mobile station. This allows identification of whether there is a repeated connection attempt by the mobile station in this frequency band.

Optionally, a method can be used in which the connection request in the frequency band by a known mobile station prompts the connection request from the mobile station to be confirmed. This allows a connection between mobile station and base station when the use of the preferred frequency band has failed.

In some exemplary embodiments, a computer program for performing at least one operation of the aforementioned method can be used, wherein the computer program runs on a programmable hardware component.

Various exemplary embodiments will now be described in more detail with reference to the accompanying drawings, which represent some exemplary embodiments. In the figures, the thickness dimensions of lines, layers and/or regions may be represented in exaggerated form for the sake of clarity.

In the description of the appended figures below, which show only some exemplary embodiments, the same reference symbols can denote the same or comparable components. Further, combined reference symbols can be used for components and objects that occur repeatedly in an exemplary embodiment or in a drawing but are described together for one or more features. Components or objects that are described by the same or combined reference symbols may be embodied in the same way, but possibly also differently, for individual, multiple or all features, for example, the dimensions thereof, unless the description explicitly or implicitly reveals otherwise.

Although exemplary embodiments can be modified and varied in different ways, exemplary embodiments are represented as examples in the figures and are described in detail here. However, it should be clarified that the intention is not to limit exemplary embodiments to the respectively disclosed forms, but rather that exemplary embodiments are instead intended to cover all functional and/or structural modifications, equivalents and alternatives that come within the scope of the disclosed embodiments. The same reference symbols denote the same or similar elements throughout the description of the figures.

The terminology that is used here serves only to describe exemplary embodiments and is not intended to limit the exemplary embodiments. As used here, the singular forms "a" and "the" are also intended to include the plural forms unless the context clearly indicates otherwise. Further, it should be clarified that expressions such as, e.g., "includes", "including", "has" and/or "having", as used here, indicate the presence of cited features, whole numbers, operations, workflows, elements and/or components, but do not exclude the presence or addition of one or more features, whole numbers, operations, workflows, elements, components and/or groups thereof.

Unless defined otherwise, all terms used here (including technical and scientific terms) have the same meaning as attributed to them by a person of average skill in the art in the field to which the exemplary embodiments belong. Further, it should be clarified that expressions, e.g., those that are defined in generally used dictionaries, should be interpreted as though they had the meaning that is consistent with their meaning in the context of the relevant art, and should not be interpreted in an idealized or excessively formal sense, unless this is expressly defined here.

Figure 1:
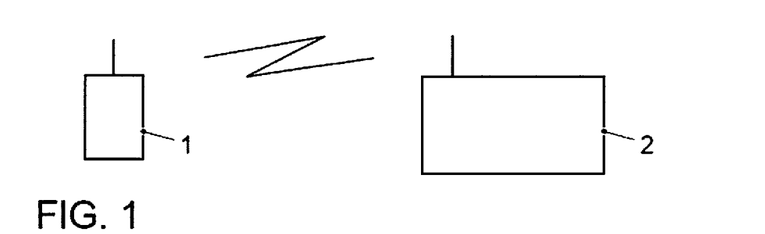
FIG. 1 shows a schematic diagram of a WLAN arrangement with a mobile station and a base station.

FIG. 1 shows a schematic diagram of a WLAN arrangement with a mobile station and a base station. The two devices are connected by an air interface in accordance with the cited WLAN standard. This standard is also referred to as the IEEE 802.11 standard, of which there are various expansion levels with different performance characteristics. Devices that correspond to one of these expansion levels can communicate at least with all other partner devices of the same expansion level without the need for separate matching of the devices to one another. Further, the standard is distinguished by direct communication by the two devices with one another and thus avoids the interposition of switching centers or the like. As such, the mobile station 1 can interchange data directly with the base station 2. In this case, the base station transmits an identification signal, what is known as a beacon, that identifies it and communicates its properties. When a mobile station spots a suitable beacon, it can set up a connection to the base station using appropriate protocol elements.

Figure 2:
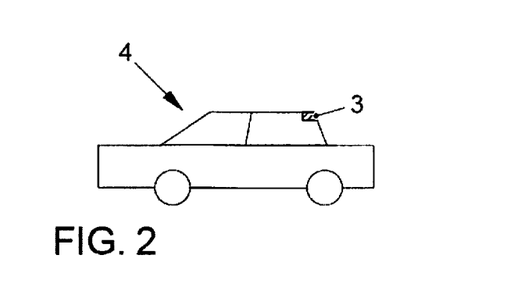
FIG. 2 shows a possible arrangement of a WLAN base station in an automobile.

FIG. 2 shows a possible arrangement of a WLAN base station 3 in an automobile 4. Base stations of the WLAN standard are usually installed at a fixed location. This installation is geared to need and may be devoted to both private and public traffic. In this disclosed embodiment, the base station is arranged in a motor vehicle, which can cover all common types such as automobile, truck, etc. This arrangement may be embodied either as a fixed installation or as a temporary installation and also covers the possibility of ex-works fitting by the motor vehicle manufacturer. By way of example, the installation of the base station can be installed in the rear view mirror or in the console or in a manner connected to an interior lighting device. In this case, the base station 2 is arranged such that essentially the whole interior of the motor vehicle is available for spatial positioning of the mobile station 1 and there is then the possibility of a good connection quality for connections to the base station 2. Optionally, it is also possible for a connection close to the motor vehicle to be covered as well.

Figure 3:
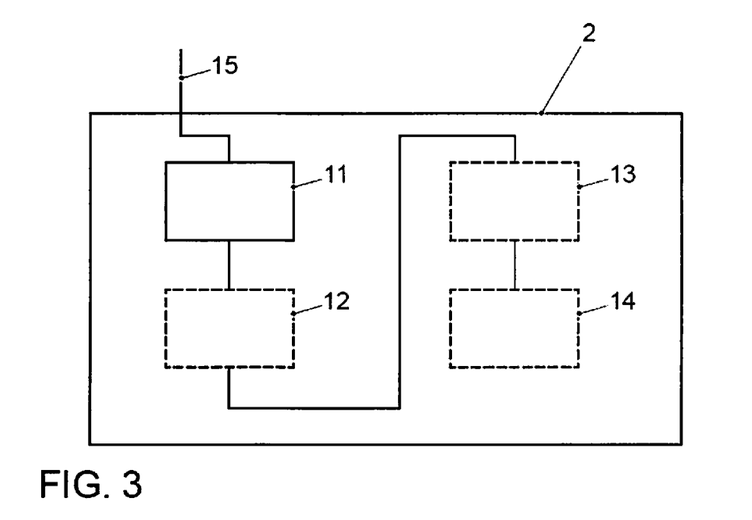
FIG. 3 shows a schematic diagram of a WLAN base station.

FIG. 3 shows a schematic diagram of a WLAN base station 2. In this case, the base station 2 shown comprises means for WLAN standard compliant communication via two frequency bands, the 2.4 GHz band and the 5 GHz band. The latter was only added in a later version of the standard. Accordingly, there are mobile stations that can communicate only in the 2.4 GHz band. More recent mobile stations can communicate in both bands. The 5 GHz band has a distinctly increased channel bandwidth and a higher-quality modulation technology. Accordingly, the channel capacity in this frequency band is much higher in comparison with the 2.4 GHz frequency band. For this reason, it is beneficial to put data traffic onto the 5 GHz band where possible. This keeps the 2.4 GHz band free for older mobile stations too, inter alia.

The base station 2 can communicate on both frequency bands. It has a design that is symmetrical for both frequency bands. As such, the elements for both bands comprise a transmission circuit 11, a provision circuit 12, a control circuit 13 and a two-way circuit 14.

The transmission circuit 11 is connected to a transmission/reception antenna 15 and designed to send beacon signals from the two frequency bands. As already explained, these beacon signals are used by the mobile stations 1 to recognize the presence of the frequency bands of a base station 2 and additionally comprise various information from the base station 2, for example, the network name ("service set identifier", SSID), a list of supported transmission rates and/or the type of encryption. In this case, the transmission power is set such that mobile stations 1 that recognize the beacon signal can interchange data with the base station 2 with what is expected to be sufficient quality. The transmission circuit 11 is further designed to send commands and reports from the base station 2 to the mobile station 1. This comprises both the association element Association Response: OK (association request accepted) or NOK (association request not accepted) and commands for changing frequency band. Furthermore, the transmission circuit 11 is suitable for transmitting user data to the mobile station 1.

The transmission circuit 11 is connected firstly to the provision circuit 12 and secondly to the antenna 15. The provision circuit 12 provides data that can be used across frequency bands. Such data can comprise the result of an authentication and/or an association between the mobile station and the apparatus and/or of a Dynamic Host Configuration Protocol—DHCP—procedure between the mobile station and the apparatus. They can be produced and interchanged before or during an association, the association naturally taking place in one frequency band. On the change of frequency band, these data can be used further, which can presuppose that the same service set identification (SSID) is used in both frequency bands.

The provision circuit 12 is connected to the control circuit 13. In this case, the control circuit 13 comprises functions that are frequency band specific. An example that may be cited here is the media access control—MAC—, which is frequency band specific and accordingly can be rearranged after each change of frequency band. Furthermore, further frequency band specific functions may be included, different frequency bands also being able to have different allocated functions. Furthermore, the control circuit 13 comprises a protocol stack that comprises the order of the commands and reports between a mobile station and apparatus. Elements of this protocol stack are also the frequency change commands and their associated reports. In this case, the frequency change commands and reports comprise an element identifier for identifying an element type (command or report), a length statement, an identifier for the frequency change command or the frequency change report, the designation of the new frequency band and a frequency band change counter. Furthermore, further parameters for determining the frequency band properties are possible.

The control circuit 13 is also connected to the two-way circuit 14. The two-way circuit 14 includes functions for maintaining the arranged association between the apparatus 2 and the mobile station 1 if it is not possible to implement the change from the first to the second frequency band, or vice versa. The two-way circuit 14 avoids termination of the connection in this case. To accomplish this, it keeps the relevant data from the previous frequency band ready to allow the mobile station to return to the previous frequency band. By way of example, the relevant data may comprise the already negotiated key for an encryption. Furthermore, the two-way circuit 14 also records frequency band aspects specific to mobile station 1. An identifier for each mobile station 1 is stored with the associated possible frequency bands. Accordingly, a change of frequency band that is not possible for a mobile station 1 is prevented from being repeatedly initiated.

Furthermore, the two-way circuit 14 also comprises a link for associating the mobile station 1 in a preferred frequency band. As described earlier on, this is achieved by lowering the transmission power of the beacon of an unpreferred frequency band. By way of example, selection of the frequency band preferred by the apparatus by lowering the transmission power of the beacon can later be followed by the frequency band being changed by frequency change command and report. Secondly, it is also possible for selection of the unpreferred frequency band to be followed, during the association, by a change of frequency being performed in the further course of the connection by frequency change commands and reports.

Figure 4:
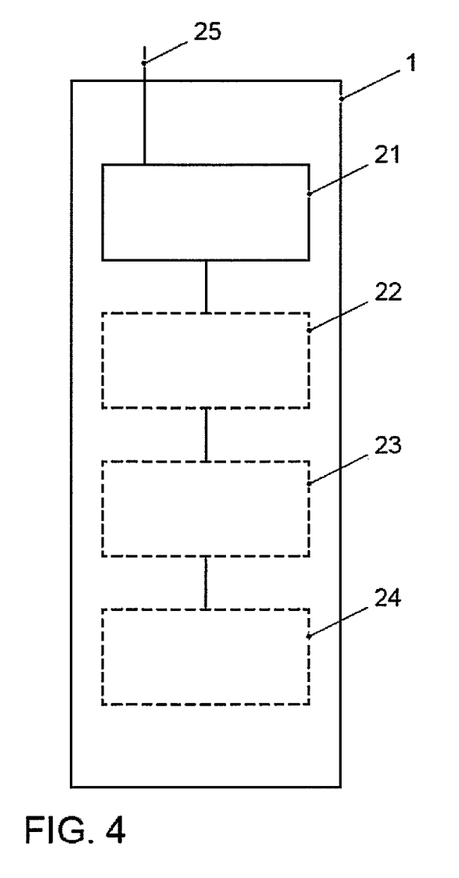
FIG. 4 shows a schematic diagram of a WLAN mobile station.

FIG. 4 shows a mobile station 1 with the units corresponding to the apparatus 2. As such, the mobile station 1 comprises a reception circuit 21 that corresponds with the transmission circuit 11 in the apparatus 2. Further, a provision circuit 22 is included that corresponds to the provision circuit 12 and comprises the cross frequency band functions. Further, a control circuit 23 is comprised that corresponds to the control circuit 13 and comprises the frequency band specific functions. Finally, a two-way circuit 24 is comprised that corresponds to the two-way circuit 14 of the apparatus 2 and provides functions for maintaining the arranged association also a link to the association of the mobile station 1 in a preferred frequency band. In this case, the circuits are connected to one another and to the antenna in accordance with the corresponding circuits of the apparatus 2.

Figure 5:
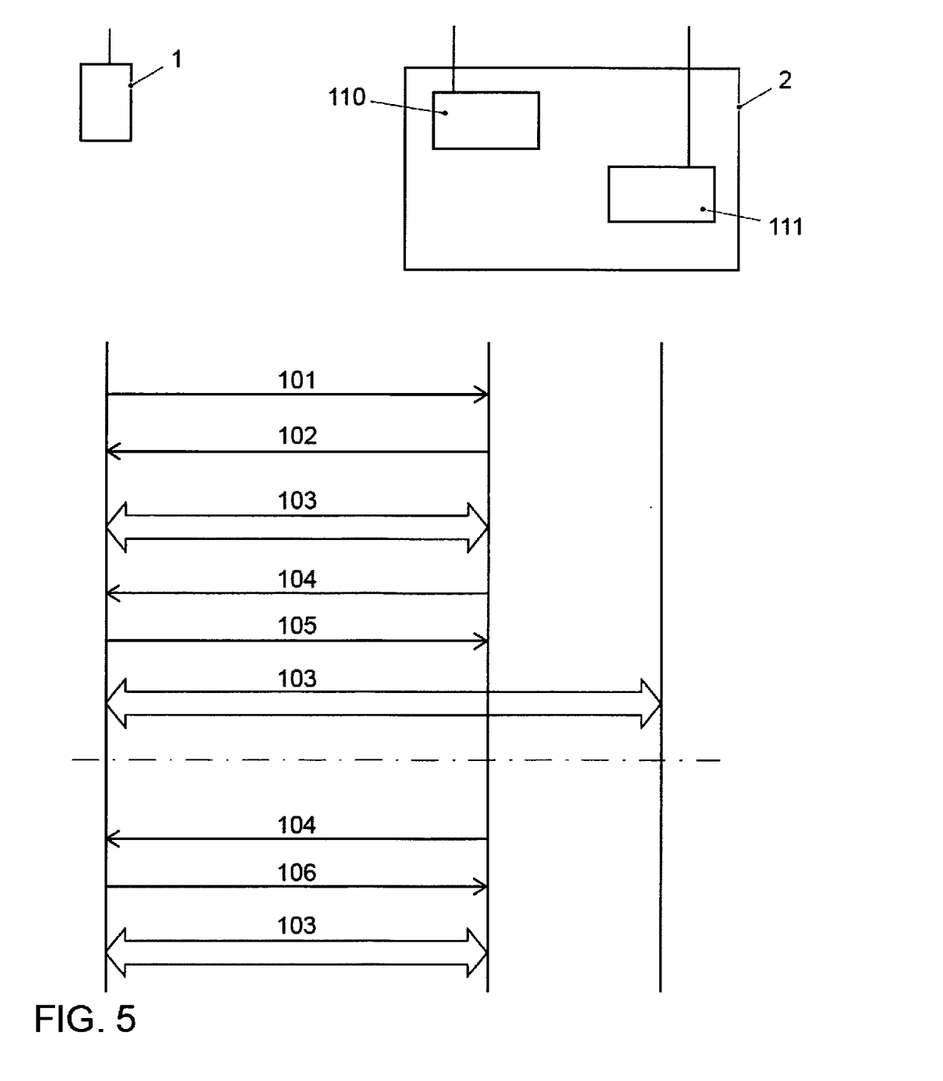
FIG. 5 shows examples of signaling sequences.

FIG. 5 shows the sequence of a method for changing frequency band. In this case, the mobile station 1 sends an association request 101 in a frequency band to the apparatus 2, e.g., as Association Request. In this case, the apparatus 2 comprises a 2.4 GHz module 110 for using the 2.4 GHz frequency band and a 5 GHz module 111 for using the 5 GHz frequency band. The apparatus 2 confirms the request with a corresponding report 102, for example, embodied as Association Response: OK. Henceforth, user data 103 are interchanged between mobile station 1 and apparatus 2. To change frequency band, the apparatus 2 now sends an appropriate frequency band change command 104, which may be embodied as Channel Switch Announcement, for example, which refers to a channel in the other frequency band. It is also possible for a new command to be stipulated for this function. In the event of confirmation, the mobile station 1 responds with the frequency band change report 105, which may be embodied as Band Switch Confirmation. Subsequently, the change of frequency band is effected and the data transmission 103 is continued on the new frequency band. In the event of the frequency band change command 104 being rejected, the mobile station 1 sends a rejecting frequency band change report 106. No change of frequency band takes place and the data transmission 103 is continued on the previous frequency band. The latter case is represented in FIG. 5 below the dashed line.

The disclosed embodiments can be summarized as follows: studies with various mobile stations have shown that rudimentary band control can be achieved by adapting the signal strength in the 2.4 and 5 GHz bands. If the 5 GHz band uses a much higher power than its 2.4 GHz counterpart, then the mobile stations connect much more often in the 5 GHz band than in the 2.4 GHz band. Laboratory tests with an ordinary base station have revealed that the power difference in the transmission power should be at least 14 dBm. So as not to impair normal handling, only the beacons and the probe response frames have their transmission power reduced.

WLAN supply in the vehicle interior is intended to be provided both by the 5 GHz band and by the 2.4 GHz band. Since the capacity in the 5 GHz band is distinctly higher (as a result of channel bandwidth and higher-quality modulation technology), it is desirable if the terminals connect to the 5 GHz WLAN—when available on the terminal. It is proposed that the power of the 2.4 GHz beacons be lowered to feign better network quality for the 5 GHz network.

In a further disclosed embodiment, frequency band change commands can be used to initiate a change of frequency band. These frequency band change commands can follow the standardized methods of the WLAN standard IEEE 802.11-2012 for channel changes, for example, in which an access point, also called a base station in this description, stipulates the change of channel for its clients, which may be implemented in mobile stations. This is necessary for fast frequency selection (Dynamic Frequency Selection—DFS—), in which clearance of a channel becomes necessary, for example, when radar interference is detected on the channel. Such channel change commands may be possible within the frequency bands (5 GHz and/or 2.4 GHz).

Frequency bands can be changed by using a frequency band change command. In contrast to a channel change command, it is not sufficient in the case of a frequency band change just to send an appropriate frequency band change command from the base station to the mobile station. Additionally, it should be borne in mind that it is necessary to change from one media access control—MAC—(for example, for 2.4 GHz) to another MAC (for example, for 5 GHz/GO). Further, it should be taken into consideration that the change of frequency band takes place seamlessly. A seamless transition of this kind avoids a new authentication and/or an interruption to the connection and/or a dynamic host configuration procedure (Dynamic Host Configuration Protocol—DHCP—) in the new frequency band, for example. If the mobile station does not support the new frequency band (for example, the 5 GHz frequency band), then a band change procedure could ensure that the connection of the mobile station is not severed completely from the network, but rather that the connection can remain in the previous frequency band (for example, in the 2.4 GHz frequency band).

The features disclosed in the description above, the claims below and the appended figures can be of importance and implemented either individually or in any combination for realizing an exemplary embodiment in their various refinements.

Although some embodiments have been described within the context of an apparatus, it goes without saying that these embodiments also represent a description of the corresponding method, which means that a block or a component of an apparatus can also be understood as a corresponding method operation or as a feature of a method operation. Similarly, embodiments that have been described within the context of or as a method operation also represent a description of a corresponding block or detail or feature of a corresponding apparatus.

Depending on implementation requirements, exemplary embodiments may be implemented in hardware or in software. The implementation can be performed using a digital storage medium, for example, a floppy disk, a DVD, a Blu-Ray disc, a CD, a ROM, a PROM, an EPROM, an EEPROM or a FLASH memory, a hard disk or another magnetic or optical memory on which electronically readable control signals are stored that can interact or do interact with a programmable hardware component such that the respective method is performed.

A programmable hardware component can be formed by a processor, a computer processor (CPU=Central Processing Unit), a graphics processor (GPU=Graphics Processing Unit), a computer, a computer system, an application-specific integrated circuit (ASIC), an integrated circuit (IC), a system on chip (SOC), a programmable logic element or a field-programmable gate array (FPGA) with a microprocessor.

In general, exemplary embodiments may be implemented as a program, as firmware, as a computer program or computer program product with a product code or as data, the program code or the data being effective to perform one of the methods when the program runs on a processor or a programmable hardware component. The program code or the data may also be stored on a machine-readable medium or data storage medium, for example. The program code or the data may be present as source code, machine code or byte code, inter alia, and as other intermediate code.

A further exemplary embodiment is additionally a data stream, a signal train or a sequence of signals that represent(s) the program for performing one of the methods described here. By way of example, the data stream, the signal train or the sequence of signals may be configured to be transferred via a data communication link, for example, via the Internet or another network. Exemplary embodiments are thus also signal trains that represent data and are suitable for sending via a network or a data communication link, with the data representing the program.

The exemplary embodiments described above are merely an illustration of the principles of the disclosed embodiments. It goes without saying that modifications and variations of the arrangements and details described here will be evident to other persons skilled in the art. The intention is that the disclosed embodiments will be limited only by the scope of protection of the patent claims that follow and not by the specific details that have been presented here on the basis of the description and the explanation of the exemplary embodiments.

The invention claimed is:

1. An apparatus for controlling a frequency band selection for wireless communication with a mobile station in a wireless local area network, wherein at least a first and a second frequency band are selectable, wherein the first and second frequency bands each comprise a multiplicity of transmission channels; the apparatus comprising:
   a transmission circuit for receiving an association request in a first frequency band from the mobile station for wireless communication in the first frequency band, and for confirming the association request with an association response and interchanging data with the mobile station in the first frequency band by transmitting at least one command to the mobile station that asks the mobile station to change from the first to the second frequency band,
   a provision circuit for providing results of a Dynamic Host Configuration Protocol procedure between the mobile station and the apparatus before the change from the first to the second frequency band, that continue to be used after the change from the first to the second frequency band, and
   a control circuit connected to a two-way circuit, which stores an identifier of the mobile station and frequency band aspects specific to the mobile station so that a change of frequency band that is not possible for the mobile station is prevented from being repeatedly initiated.

2. The apparatus of claim 1, wherein the provision circuit provides results of an authentication and/or an association between the mobile station and the apparatus that continue to be used after the change from the first to the second frequency band.

3. The apparatus of claim 1,
   wherein the control circuit arranges a media access control between the mobile station and the apparatus after the change from the first to the second frequency band.

4. The apparatus of claim 1,
   wherein the two-way circuit maintains the arranged association between the apparatus and the mobile station if it is not possible to implement the change from the first to the second frequency band.

5. A motor vehicle including an apparatus for controlling a frequency band selection for wireless communication with a mobile station in a wireless local area network, wherein at least a first and a second frequency band are selectable, wherein the first and second frequency bands each comprise a multiplicity of transmission channels; the apparatus comprising:
   a transmission circuit for transmitting at least one command to the mobile station that asks the mobile station to change a data exchange connection with the apparatus from the first to the second frequency band, and
   a provision circuit for providing results of a Dynamic Host Configuration Protocol procedure between the mobile station and the apparatus before the change from the first to the second frequency band, that continue to be used after the change from the first to the second frequency band,
   and a control circuit connected to a two-way circuit, which stores an identifier of the mobile station and frequency band aspects specific to the mobile station so that a change of frequency band that is not possible for the mobile station is prevented from being repeatedly initiated,
   wherein the apparatus is arranged so that the whole interior of the motor vehicle is available for spatial positioning of the mobile station for a communication with the apparatus.

6. The motor vehicle of claim 5, wherein the provision circuit provides results of an authentication and/or an association between the mobile station and the apparatus that continue to be used after the change from the first to the second frequency band.

7. The motor vehicle of claim 5, wherein the control circuit arranges a media access control between the mobile station and the apparatus after the change from the first to the second frequency band.

8. The motor vehicle of claim 5, wherein the two-way circuit maintains the arranged association between the apparatus and the mobile station if it is not possible to implement the change from the first to the second frequency band.

9. A mobile station for a frequency band selection for wireless communication with an apparatus in a wireless local area network, wherein at least a first and a second frequency band are selectable, wherein the first and second frequency bands each comprise a multiplicity of transmission channels; the mobile station comprising:
   a transmission circuit for sending an association request in the first frequency band for wireless communication in the first frequency band to the apparatus;
   a reception circuit for receiving at least one command from the apparatus and confirming the association request with an association response and interchanging data with the mobile station in the first frequency band, that asks the mobile station to change a data exchange connection with the apparatus from the first to the second frequency band;
   a provision circuit for providing results of a Dynamic Host Configuration Protocol procedure between the mobile station and the apparatus before the change from the first to the second frequency band, that continue to be used after the change from the first to the second frequency band; and
   a control circuit connected to a two-way circuit, which stores an identifier of the mobile station and frequency band aspects specific to the mobile station so that a change of frequency band that is not possible for the mobile station is prevented from being repeatedly initiated.

10. The mobile station of claim 9, wherein the provision circuit provides results, ascertained before the change from the first to the second frequency band, of an authentication and/or an association between the mobile station and the apparatus that continue to be used after the change from the first to the second frequency band.

11. The mobile station of claim 9,
    wherein the control circuit arranges a media access control between the mobile station and the apparatus after the change from the first to the second frequency.

12. The mobile station of claim 9, wherein the two-way circuit maintains the arranged association between apparatus and mobile station if it is not possible to implement the change from the first to the second frequency band.

13. A system for controlling a frequency band selection for wireless communication in a wireless local area network with an apparatus and a mobile station, the apparatus controlling a frequency band selection for wireless communication with a mobile station in a wireless local area network, wherein at least a first and a second frequency band are selectable, wherein the first and second frequency bands each comprise a multiplicity of transmission channels;

the apparatus comprising:

a transmission circuit for transmitting at least one command to the mobile station that asks the mobile station to change from the first to the second frequency band, and a provision circuit for providing results, ascertained before the change from the first to the second frequency band, of a Dynamic Host Configuration Protocol procedure between the mobile station and the apparatus that continue to be used after the change from the first to the second frequency band, or vice versa, and a mobile station for a frequency band selection for wireless communication with an apparatus in a wireless local area network, wherein at least a first and a second frequency band are selectable, wherein the first and second frequency bands each comprise a multiplicity of transmission channels, wherein the mobile station comprises a transmission circuit for sending an association request in a first frequency band for wireless communication in the first frequency band to the apparatus, and a reception circuit for receiving at least one command from the apparatus that asks the mobile station to change a data exchange connection with the apparatus from the first to the second frequency band, and a provision circuit for providing results of a Dynamic Host Configuration Protocol procedure between the mobile station and the apparatus before the change from the first to the second frequency band, that continue to be used after the change from the first to the second frequency band, and wherein the apparatus further comprises a control circuit connected to a two-way circuit, which stores an identifier of the mobile station and frequency band aspects specific to the mobile station so that a change of frequency band that is not possible for the mobile station is prevented from being repeatedly initiated.

14. The system of claim 13, wherein each provision circuit provides results of an authentication and/or an association between the mobile station and the apparatus that continue to be used after the change from the first to the second frequency band.

15. The system of claim 13, wherein the control circuit arranges a media access control between the mobile station and the apparatus after the change from the first to the second frequency band.

16. The system of claim 13, wherein the two-way circuit maintains the arranged association between the apparatus and the mobile station if it is not possible to implement the change from the first to the second frequency band.

17. The system of claim 13, wherein each provision circuit provides results, ascertained before the change from the first to the second frequency band, of an authentication and/or an association between the mobile station and the apparatus that continue to be used after the change from the first to the second frequency band.

18. The system of claim 13, wherein the mobile station further comprises a control circuit for arranging a media access control between the mobile station and the apparatus after the change from the first to the second frequency band.

19. The system of claim 13, wherein mobile station further comprises a two-way circuit for maintaining the arranged association between apparatus and mobile station if it is not possible to implement the change from the first to the second frequency band.

20. A method for controlling a frequency band selection for wireless communication by an apparatus with a mobile station in a wireless local area network, wherein at least a first and a second frequency band are selectable, the first and second frequency bands each comprising a multiplicity of transmission channels; the method comprising:

receiving an association request from the mobile station in a first frequency band for wireless communication in the first frequency band, establishing a data exchange connection between the mobile station and the apparatus in the first frequency band, transmitting at least one command to the mobile station that asks the mobile station to change a data exchange connection with the apparatus from the first to the second frequency band; and providing results-of a Dynamic Host Configuration Protocol procedure between the mobile station and the apparatus for use after the change from the first to the second frequency band, and storing an identifier of the mobile station and frequency band aspects specific to the mobile station so that a change of frequency band that is not possible for the mobile station is prevented from being repeatedly commanded.

21. The method of claim 20, wherein results, ascertained before the change from the first to the second frequency band, or vice versa, of an association and/or an authentication between the mobile station and the apparatus are provided for use after the change from the first to the second frequency band.

22. The method of claim 20, wherein an arrangement of a media access control between the mobile station and the apparatus is made again after the change from the first to the second frequency band.

23. The method of claim 20, wherein, if it is not possible to implement the change from the first to the second frequency band, then the association between apparatus and mobile station that was arranged before the command to change from the first to the second frequency band, is maintained.

24. A non-transitory computer program product comprising a computer executable program for performing a method for controlling a frequency band selection for wireless communication by an apparatus with a mobile station in a wireless local area network, wherein at least a first and a second frequency band are selectable, the first and second frequency bands each comprising a multiplicity of transmission channels; the method comprising:

receiving an association request from the mobile station for wireless communication in a first frequency band and establishing a data exchange connection in the first frequency band, transmitting at least one command to the mobile station that asks the mobile station to change a data exchange connection with the apparatus from the first to the second frequency band;

providing results, of a Dynamic Host Configuration Protocol procedure between the mobile station and the apparatus for use after the change from the first to the second frequency band, wherein the computer program runs on a programmable hardware component, and storing an identifier of the mobile station and frequency band aspects specific to the mobile station so that a change of frequency band that is not possible for the mobile station is prevented from being repeatedly commanded.

* * * * *